(12) United States Patent
Grange et al.

(10) Patent No.: US 11,975,383 B2
(45) Date of Patent: May 7, 2024

(54) MOULDING DEVICE

(71) Applicant: SAFRAN, Paris (FR)

(72) Inventors: David Grange, Moissy-Cramayel (FR); Ramzi Bohli, Moissy-Cramayel (FR)

(73) Assignee: SAFRAN, Paris (FR)

( * ) Notice: Subject to any disclaimer, the term of this patent is extended or adjusted under 35 U.S.C. 154(b) by 341 days.

(21) Appl. No.: 17/598,037

(22) PCT Filed: Mar. 24, 2020

(86) PCT No.: PCT/EP2020/058207
§ 371 (c)(1),
(2) Date: Sep. 24, 2021

(87) PCT Pub. No.: WO2020/193574
PCT Pub. Date: Oct. 1, 2020

(65) Prior Publication Data
US 2022/0176441 A1 Jun. 9, 2022

(30) Foreign Application Priority Data
Mar. 25, 2019 (FR) ........................... 1903052

(51) Int. Cl.
B22C 7/02 (2006.01)
B22C 9/10 (2006.01)
B22C 9/22 (2006.01)
B29C 45/14 (2006.01)
B29C 45/76 (2006.01)

(52) U.S. Cl.
CPC ............... B22C 7/02 (2013.01); B22C 9/10 (2013.01); B22C 9/22 (2013.01); B29C 45/1418 (2013.01); B29C 45/76 (2013.01)

(58) Field of Classification Search
CPC .... B22C 7/02; B22C 9/10; B22C 9/22; B22C 21/14
USPC .... 164/4.1, 150.1, 154.1, 6, 15, 20, 28, 159, 164/228
See application file for complete search history.

(56) References Cited

U.S. PATENT DOCUMENTS

2013/0174998 A1* 7/2013 Pourfilet et al. ........ B22C 21/14
164/159
2013/0333855 A1 12/2013 Merrill et al.
2019/0030592 A1 1/2019 Tewes et al.

FOREIGN PATENT DOCUMENTS

JP 61-232040 A * 10/1986 ............... B22C 9/06
WO WO 2012/052665 A1 4/2012

OTHER PUBLICATIONS

French Preliminary Search Report for French Application No. 1903052, dated Dec. 9, 2019.
(Continued)

Primary Examiner — Kevin P Kerns
(74) Attorney, Agent, or Firm — BIRCH, STEWART, KOLASCH & BIRCH, LLP

(57) ABSTRACT

A moulding device (1) for moulding a material around a core (2), comprising a hollow moulding enclosure (3) suitable for receiving the core (2), and means for controlling the shape of the core (2) in the hollow enclosure (3), the control means comprising means for deforming the core (2). The control means further comprise force control means and a control unit (8) suitable for actuating the deformation means in accordance with information provided by the force control means.

12 Claims, 1 Drawing Sheet

(56) References Cited

OTHER PUBLICATIONS

International Search Report and Written Opinion of the International Searching Authority for International Application No. PCT/EP2020/058207, dated Apr. 17, 2020.

* cited by examiner

MOULDING DEVICE

FIELD OF THE INVENTION AND STATE OF THE ART

The present invention relates to a molding device and more particularly to a molding device for the manufacture of turbomachine elements.

Traditionally, the hollow turbine blades are made of nickel superalloy by a lost-wax casting process.

In the field of molding, it is known to use a core to mold a hollow element. In the case, for example, of the manufacture of hollow blades, it is usual to use a ceramic core around which wax is injected. The wax shape thus molded will then be used as a model to build a ceramic mold (also called shell) in which the hollow blade will be molded.

It is necessary for the ceramic core to have a shape as close as possible to the estimated theoretical shape, because this conditions the dimensional compliance with the future hollow blade.

However, usually, due to the dispersion of the core manufacturing method, a shape variation on the order of more or less 0.2 mm is often observed.

Traditionally, the geometry of the core is monitored with a coordinate measuring machine (CMM). Then, in the injection device, supports on the core are adjusted to counter the shape dispersions and deform the core so that it is as close as possible to the estimated theoretical shape. This method allows compensating for the deformations due to the manufacture of the core. However, during the injection method, the wax exerts many forces on the core, which tend to deform the latter. However, the known method for adjusting the supports requires the immobilization of the molding device and the monitoring of the core with a CMM to reposition the supports.

Another solution consists in holding the core in static indeterminacy conditions, in the injection device (i.e. with a number of supports greater than the numbers of degrees of freedom). This technical disposition allows over-stressing the core to deform it in a geometrical shape close to its theoretical geometry. However, the core is over-stressed and presents a high risk of breaking. In addition, this method does not allow adapting the deformation of the core to the stresses exerted by the injected wax.

In this technical context, it is necessary to provide a molding device that allows deforming the core based on its manufacturing dispersions, but also based on the forces exerted by the liquid or pasty wax, without the risk of breaking the core.

GENERAL PRESENTATION OF THE INVENTION

According to a first aspect, the invention relates to a molding device for molding a material around a core, comprising a hollow molding enclosure adapted to receive the core, and means for controlling the shape of the core in the hollow enclosure. The control means comprise means for deforming the core. In addition, the control means further comprise force monitoring means and a control unit adapted to actuate the deformation means based on information given by the force monitoring means.

In a particularly advantageous manner, the control means allow a dynamic deformation of the core based on the information given by the monitoring means. The dynamic deformation of the core allows holding the core in a shape within the manufacturing tolerances, while minimizing the forces applied on the core. In other words, the dynamic deformation of the core allows modifying the shape of the core in real time, based on the forces applied thereto, to contain it within an acceptable dimensional range. It is remarkable that the objective of dynamic deformation is not necessarily to bring the core into its theoretical shape, but into a shape contained in a dimensional range. This difference allows reducing the forces applied to the core while producing a conformal molding.

Thus, the invention proposes a molding device that allows deforming the core based on its manufacturing dispersions, but also based on the forces exerted by the liquid wax, without the risk of breaking the core.

The monitoring means may comprise at least one force sensor adapted to measure a force applied on the core.

The deformation means can allow deforming the core along three orthogonal directions in space.

The deformation means can allow deforming the core along several combined directions.

The control unit can be adapted to actuate the deformation means so that a stress in the core is minimal as long as the core is shaped in a position and a shape within predetermined manufacturing tolerances.

The deformation means may comprise support portions on the core serving as a stopper blocking the core.

The deformation means may comprise movable support elements on the core that allow exerting a pressure to deform the core.

The deformation means may comprise at least two movable support elements on the core that allow each exerting a pressure in the opposite direction to deform the core.

According to another aspect, the invention relates to a molding process using a molding device according to the invention.

The molding process may comprise a step of dynamically deforming the core to shape the core in a position and a shape within manufacturing tolerances, while minimizing the stresses applied on the core.

The molding process may comprise the following steps:
modeling of the core,
positioning of the support portions on the core to hold the core,
numerical simulation of the forces applied to the core and of any deformation and displacement of the core during a phase of injection of material into the hollow enclosure comprising the core,
implementation of the results of the numerical simulation in the control unit,
injection of material into the hollow enclosure and dynamic deformation of the core by movable support elements.

The step of dynamically deforming the core may comprise, redundantly, the following phases:
determination of the stress of the core based on the forces measured on the core,
deformation of the core based on the determined stress.

The step of modeling the core may comprise a phase of measuring the dimensions of the core in order to obtain a model of the core having said dimensions.

DESCRIPTION OF THE FIGURES

Other characteristics and advantages of the invention will emerge from the following description, which is purely illustrative and not limiting, and should be read in relation to the appended figures in which.

DETAILED DESCRIPTION OF THE INVENTION

General Architecture of the Device

Figure 1:
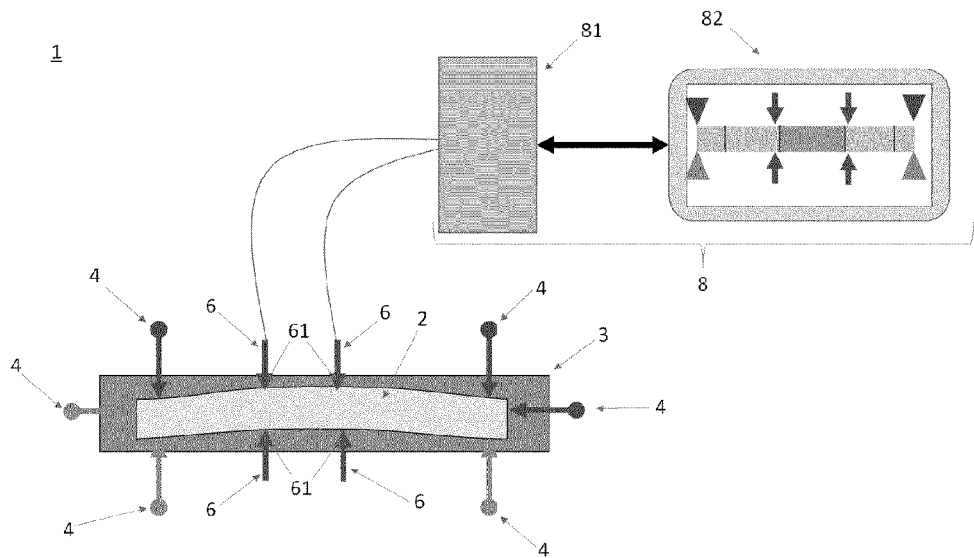
FIG. 1 is a schematic representation of a device according to the invention.

Referring to FIG. 1, the invention relates to a molding device 1 for molding a material around a core 2.

It is specified that the core 2 is an element external to the device 1. In a conventional manner, the core 2 used can be made of ceramic and has the shape and dimensions of a cavity of the final part which will be lost-wax molded.

As a reminder, it is recalled that the lost-wax molding consists first of all in obtaining a wax model having the shape of the final part to be molded (it will be understood that other liquid materials can be used, but for convenience in the remainder of the description, the preferred example of wax will be taken). Traditionally, the operation is carried out by over-injection of the wax around the ceramic core in an aluminum mold.

Then, secondly, the wax model is molded in a ceramic shell (i.e. the ceramic shell is formed around the wax model). The wax is then removed to cast instead the molten metal (in the shell, around the core). The ceramic mold is then destroyed and the ceramic core is extracted to recover the molded part.

The present device 1 is the device for obtaining the wax model, it comprises a hollow molding enclosure 3 and means for controlling the shape of the core in the hollow enclosure 3.

Hollow Enclosure

In a known manner, the hollow enclosure 3 can have at least two half-shells each having an enclosure adapted to receive the core 2. The hollow enclosure 3 can be made of aluminum or steel, or any other material adapted to the molding of a wax model.

The shape of the hollow enclosure 3 is defined as the external shape of the final part to be molded.

Control Means

The control means comprise core deformation means, force monitoring means, and a control unit 8 adapted to actuate the deformation means based on information given by the force monitoring means and by a calculation model implanted in the control unit 8.

As will be described later, in a particularly advantageous manner, the control means allow dynamic deformation of the core based on the information given by the monitoring means.

The deformation means allow holding and deforming the core 2, advantageously along two or three orthogonal directions of space, combined where appropriate. In other words, the deformation means allow exerting compressive forces along one direction or several directions in space, and also allow exerting bending and torsional forces.

According to a particular disposition, the deformation means comprise a plurality of support portions 4. It will be understood that according to a preferred disposition, the support portions 4 hold the core 2 in isostatic conditions so as to block it to allow its deformation. However, according to another disposition, the support portions 4 can ensure a hypostatic holding of the core 2, the isostatism then being expected thanks to the additional holding ensured by movable support elements 6 (which will be presented below).

According to the schematized embodiment, in two dimensions, FIG. 1 represents six support portions 4 of the device 1.

However, the device 1 (which extends in three dimensions) preferably has twelve support portions 4 paired to block the six degrees of freedom of the core 2 in the hollow enclosure 3. It is recalled that conventionally, the six degrees of freedom correspond, in a reference frame orthogonal to the three directions of translation along each axis of the reference frame, and to the three possible rotations about each axis of said reference frame.

In a particularly advantageous manner, the support portions 4 are point supports.

In addition, the deformation means comprise movable support elements 6 that allow exerting a variable and controlled force on the core 2 in order to deform it.

Preferably, the movable support elements 6 are point supports.

The monitoring means comprise several force sensors 61 adapted to measure forces on the core 2 (i.e. forces "exerted" by the core 2 on the force sensors 61. The measured forces result from the internal stress caused by the forces applied by the movable support elements 6, and during the injection, by the wax-like liquid material). In a known manner, the force sensors can be, for example, piezoelectric cells or dynamometers.

In a particularly advantageous manner, the force sensors 61 can be integrated into the movable support elements 6.

The monitoring means and the deformation means are controlled by a control unit 8. As schematized in FIG. 1, the control unit 8 may comprise a processing unit 81 and a display unit 82. The unit control 8 can be a personal computer or a man-machine interface comprising at least: a processor, display means and actuators (buttons, knobs, etc.).

The control unit 8 is advantageously configured to calculate from the information provided by the force sensors 61 said stress in the core 2 (caused by the forces applied on the core 2).

Such a configuration allows adjusting the forces applied on the core 2 by the deformation means so as to avoid any risk of breaking. More specifically, the control unit 8 is preferably adapted to actuate the deformation means so that the stress in the core 2 is below a predetermined threshold (typically breaking threshold minus a margin), or even minimal as long as the core 2 is shaped in a position and shape within predetermined manufacturing tolerances (see below).

Method

The invention also relates to a molding process using the molding device 1 according to the invention.

According to a particular disposition, the molding process may comprise the following steps:

modeling of the core 2, positioning of the support portions 4 on the core 2 to hold it, numerical simulation of the forces applied to the core 2 and of any deformation and displacement of the core 2 during a phase of injection of material into the hollow enclosure comprising the core 2, implementation of the results of the numerical simulation in the control unit 8, injection of material (wax type) into the hollow enclosure 3 and dynamic deformation of the core 2 by movable support elements 6.

In a particularly advantageous manner, the step of modeling the core 2 may comprise a phase of measuring the dimensions of the core 2 to obtain a model of the core 2 having said dimensions. The measurement of the dimensions of the core 2 can for example be carried out using a coordinate measuring machine (CMM).

The numerical simulation of the forces applied to the core 2 is carried out using a calculation model that allows predicting the stresses associated with the deformations by calculating the stress fields σi, where i varies from 1 to n (with n the number of movable support elements 6).

Preferably, the main assumption of said model is that the core has linear elastic behavior, which is very close to reality for a ceramic material before breaking. It is also assumed that the different movable support elements 6 are in contact with the core 2. With such assumptions, the mechanical problem is said to be linear. This can be reflected as follows:

Let σ(x) the stress tensor field in the ceramic core 2.
Let $F_1, \ldots, F_n$ the value of the forces measured at the different sensors of the movable contact points.
Let $\sigma_i(x)$ the value of the stress tensor field, for a unit value $F_i$, and values $F_j=0$ for j different from i.
Then, for a combination $(F_1, \ldots, F_n)$, the value of the stress field is: $\sigma(x)=(\Sigma_i F_i \sigma_i(x))$ Under these conditions, the following process can be followed. When designing a core 2, the latter is modeled by Computer-Aided Design (CAD) software, and the position of the points of contact between the core 2 (support points 4 and movable support elements 6) and the hollow enclosure 3 are frozen. Several elastic calculations to calculate the stress fields $\sigma_i$ can then be carried out upstream of the use of the device. In one example where there would be six movable support elements 6, this amounts to performing six calculations. Then, the stress fields of the results $\sigma_i$ can be loaded on the processing unit 81 of the control unit 8. When using the device, the values $F_i$ are measured by the force sensors 61 and transmitted in real time to the processing unit 81. To know the stress field, the processing unit 81 only needs to perform a sum (equation above), which can be done in real time, and display the result with the display unit 82. This kind of operation can be done with tools available on the market, or by a visual display tool developed specifically for this application.

It is specified that by "dynamic" is meant that the deformation can vary in real time during the injection of material so as to adjust the forces applied on the core 2 (the injected material modifies these forces).

Figure 2:
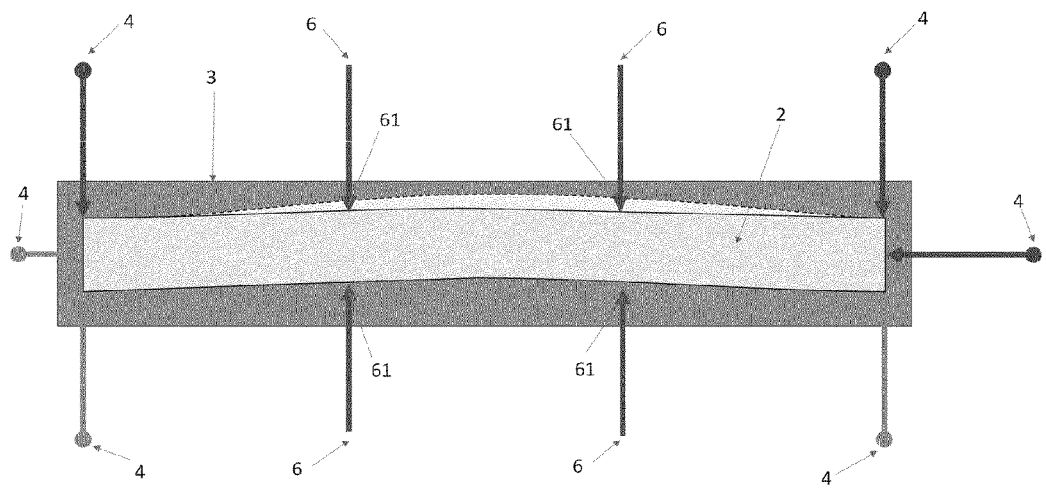
FIG. 2 is a schematic representation of the dynamic deformation of a core.

As schematized in FIG. 2, the step of dynamically deforming the core 2 allows shaping the core 2 in a position and a shape within manufacturing tolerances, while minimizing the stresses in the core. In other words, the objective of the dynamic deformation step is not to return the core 2 to its ideal theoretical shape, but to deform it in order to contain it within an acceptable dimensional range. This is a particularly advantageous technical disposition that allows achieving conformal molding while having a minimum fatigue of the core 2.

In summary, the control unit 8 is not configured to shape the core 2 in its ideal theoretical position and shape, but in the position and shape, among those within manufacturing tolerances, which minimizes the stresses in the core 2.

It is remarkable that the step of dynamically deforming the core 2 can iteratively comprise the following phases:
determination of a stress in the core 2 based on the forces measured on the core 2,
deformation of the core 2 based on the determined stress.

Thus, the dynamic deformation step can be carried out continuously throughout the wax injection step in the hollow enclosure 3.

In other words, throughout the step of injecting wax into the hollow enclosure 3, the monitoring means signal the forces exerted on the core 2 and the control unit 8 continuously controls the deformation means to continuously adjust the shape of the core 2. This is a particularly advantageous technical disposition compared to the known devices that do not allow continuous control with a monitoring loop by force sensors 61.

Thus, the invention proposes a molding device 1 that allows deforming the core 2 based on its manufacturing dispersions, but also based on the forces exerted by the liquid wax, without the risk of breaking the core 2.

The invention claimed is:

1. A molding device for molding a material around a core, said molding device comprising a hollow molding enclosure adapted to receive the core, and control means for controlling a shape of the core in the hollow molding enclosure, the control means comprising deformation means for deforming the core, wherein the control means further comprise force monitoring means and a control unit adapted to actuate the deformation means based on information given by the force monitoring means.

2. The molding device according to claim 1, wherein the force monitoring means comprise at least one force sensor adapted to measure a force applied on the core.

3. The molding device according to claim 1, wherein the deformation means is configured to deform the core along three orthogonal directions in space.

4. The molding device according to claim 1, wherein the control unit is configured to actuate the deformation means so that a stress in the core is minimal as long as the core is shaped in a position and a shape within predetermined manufacturing tolerances.

5. The molding device according to claim 1, wherein the deformation means comprise support portions on the core serving as a stopper blocking the core.

6. The molding device according to claim 1, wherein the deformation means comprise movable support elements on the core configured to exert a pressure to deform the core.

7. The molding device according to claim 6, wherein the deformation means comprise at least two movable support elements on the core configured to exert pressure in opposite directions to deform the core.

8. A molding process using a device according to claim 1, said molding process comprising
receiving a core in a hollow molding enclosure,
controlling a shape of the core in the hollow enclosure by control means,
deforming the core by deformation means, and
actuating the deformation means based on information given by force monitoring means.

9. The molding process according to claim 8 comprising a step of dynamically deforming the core to shape the core in a position and a shape within predetermined manufacturing tolerances, while minimizing stresses applied on the core.

10. The molding process according to claim 9, wherein the step of modeling of the core comprises a phase of measuring dimensions of the core in order to obtain a model of the core having said dimensions.

11. The molding process according to claim 8 comprising the following steps:
modeling of the core,
positioning of support portions on the core to hold the core,
numerical simulation of forces applied to the core and of any deformation and displacement of the core during a phase of injection of material into the hollow molding enclosure comprising the core, implementation of results of the numerical simulation in the control unit, injection of material into the hollow enclosure and dynamic deformation of the core by movable support elements.

12. The molding process according to claim 8, wherein the step of dynamic deformation of the core comprises, iteratively, the following phases:

determination of stress of the core based on forces measured on the core, deformation of the core based on the determined stress.

* * * * *